United States Patent Office 3,306,874
Patented Feb. 28, 1967

3,306,874
OXIDATION OF PHENOLS
Allan S. Hay, Schenectady, N.Y., assignor to General
Electric Company, a corporation of New York
No Drawing. Filed July 24, 1962, Ser. No. 212,127
10 Claims. (Cl. 260—47)

This invention relates to the preparation of self-condensation products of aromatic compounds containing an hydroxy group directly bonded to the aromatic nucleus, by a process which comprises reacting these compounds with oxygen in the presence of a dissolved oxygen-carrying intermediate comprising an aliphatic amine-basic cupric salt complex wherein the amine has at least one hydrogen on the amine nitrogen, and to the novel products produced by this method. More particularly, this invention relates to the oxidation of phenols to self-condensation products in the presence of a dissolved oxygen-carrying intermediate comprising an aliphatic amine-basic cupric salt complex, the amine being either a primary or secondary amine, and to the novel polymeric products produced thereby. In the preferred embodiment, this invention relates to the preparation of self-condensation products of monohydric, monocyclic phenols by reacting these phenols with oxygen using as the oxygen-carrying intermediate, a solution comprising a basic cupric salt complex of an aliphatic amine selected from the group consisting of aliphatic, including cycloaliphatic, primary amines, aliphatic, including cycloaliphatic, secondary amines and alicyclic secondary amines in which the amine nitrogen forms a part of the ring, and to the novel polyphenylene ethers produced by this process.

I use the term "monohydric, monocyclic phenol" in its true chemical sense to designate those compounds containing only one hydroxy group directly attached to a six-membered aromatic ring composed only of carbon atoms, viz., a monohydric phenol of the benzene series. Such a term includes the monohydric, monocyclic phenols such as phenol itself, and those compounds wherein one or more of the ring hydrogens of phenol has been substituted, e.g., the cresols, the xylenols, pseudo-cumenol, etc. It does not include the monohydride, bicyclic phenols such as the α-naphthols and β-naphthols, etc.; the monohydric tricyclic phenols such as the anthranols and anthrols, etc.; and other similar monohydric aromatic compounds.

In a series of articles by Brackman et al., Rec. trav. chim., 74, 937–955, 1021–1039, 1071–1080, 1101–1119 (1955), there is disclosed a process for oxidizing phenols in the presence of amines and cupric salts. This series of articles reports experimental work wherein oxygen is reacted with monocyclic and bicyclic phenols in the presence of a cupric salt and primary, secondary and tertiary amines. In the presence of primary and secondary amines, both the monocyclic and bicyclic phenols are oxidized to produce o-quinone compounds in which the amine forms an integral part of the product molecule. In the presence of a tertiary amine, only the bicyclic phenols, viz., naphthols, can be oxidized. The products in this case are simple compounds such as naphthoquinones, formed from one or two molecules of the naphthol, naphthones, formed from two molecules of the naphthol and, in the case of β-naphthol (naphthol-2), a naphthoquinone formed from three molecules of the naphthol. No reaction whatsoever occurred when attempts were made to oxidize monocyclic phenols in the presence of a cupric salt and tertiary amines. As Brackman states on page 939, "With respect to the phenols of the benzene series, tertiary amines are completely inactive."

In my copending application Serial No. 212,128, filed concurrently herewith and assigned to the same assignee as the present invention, and which is a continuation-in-part of my application, Serial No. 69,245, filed October 25, 1960, now abandoned, as a continuation-in-part of my earlier parent application, Serial No. 744,086, filed June 24, 1958, now abandoned, I have disclosed and claimed a method of oxidizing monohydric, monocyclic phenols to various products, which comprises oxidizing such phenols with oxygen, using as the oxygen-carrying intermediate, a solution comprising a tertiary amine-basic cupric salt complex in which the phenol reactant is soluble. Primary and secondary amines are not suitable, in general, for this reaction as substitutes for the tertiary amine because of the weakly basic nature and oxidative instability of the aromatic primary and secondary amines and because the primary and secondary aliphatic amines are reactive with many of the same phenols used as starting materials. I have now discovered that primary and secondary aliphatic amines (including cycloaliphatic amines in which the amine nitrogen is part of the ring and cycloaliphatic amines in which the cycloaliphatic group is a substituent on the amine nitrogen) may be used in forming an amine-basic cupric salt complex for oxidation of phenols to various self-condensation products, providing the phenols are substituted in the 2- and 6-position (both ortho positions) with various substituents, as described later. Such amines may best be described as amines having an amine nitrogen which is free of directly bonded aryl substituents and has at least one directly bonded hydrogen atom. This application therefore differs from my above-mentioned copending applications in being more limited in the phenol reacted, and in using as the oxygen-carrying intermediate a primary or secondary amine-basic cupric salt complex.

The present invention is concerned with a method of oxidizing monohydric, 2,6-disubstituted, monocyclic phenols to various products in substantially quantitative yields which comprises oxidizing such phenols with oxygen, using as the oxygen-carrying intermediate, a solution comprising an amine-basic cupric salt complex in which the phenol reactant is soluble, the said amine having at least one hydrogen on the amine nitrogen. It was indeed surprising and unexpected to find, in view of the teaching of Brackman et al. with regard to the oxidation of mono- and polycyclic phenols, that my method is applicable to monocyclic, 2,6-disubstituted, monohydric phenols. Furthermore, by my process the amine does not become an integral part of the reaction product. The products produced by my process are dependent on the phenol used as the starting material, the amine used in the catalyst system, the modifiers present, and the reaction conditions. They vary from crystalline quinones having a simple structure to polyphenylene ethers having extremely high molecular weight and containing a repeating unit which is dependent on the starting material.

The overall oxidation reaction to which my invention is directed is a reaction involving the hydrogen atom of the phenolic group of the phenol molecule, a hydrogen, chlorine, bromine, or iodine substituent in the para (4-) position of the phenol molecule and oxygen with the formation of water and polyarylene ethers (more specifically polyphenylene ethers) and/or diphenoquinones according to the following schematic diagram:

Equation I

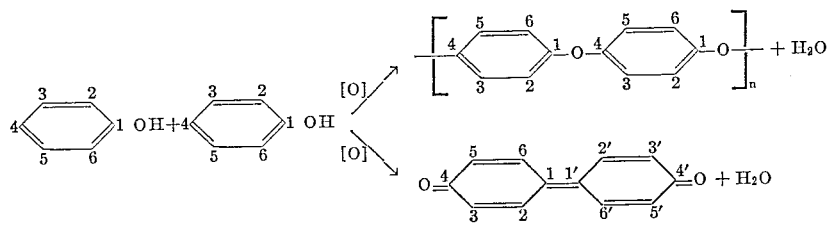

where the numbers indicate the positions of substituents and joining in the names used in this specification, and $n$ is an integer having a value of at least 10.

It is to be understood that the reaction is not a direct oxidation as illustrated but an oxidation involving participation of the copper catalyst system as an oxygen-carrying intermediate.

The general method of carrying out my oxidation process is to pass an oxygen-containing gas through a mixture of one or more monohydric, 2,6-disubstituted, monocyclic phenols (hereinafter referred to as "phenols") as starting material, in a solution also containing dissolved therein a complex comprising a complex of at least one basic cupric salt and at least one amine having at least one hydrogen on the amine nitrogen, i.e., at least one primary or secondary amine.

The phenols, which can be oxidized by my process, are represented by the following formula:

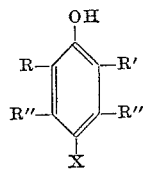

where X is a substituent selected from the group consisting of hydrogen, chlorine, bromine, and iodine, R is a monovalent substituent selected from the group consisting of hydrocarbon radicals, hydrocarbonoxy radicals, haloaryl radicals wherein all halogens are substituted on aromatic carbon atoms, and haloaryloxy radicals wherein all halogens are substituted on aromatic carbon atoms, R' is the same as R and, in addition, halogen, i.e., fluorine, chlorine, bromine, iodine, and R" is the same as R and in addition hydrogen and halogen, and is preferably hydrogen.

In providing the catalyst comprising a basic-cupric salt and an amine having at least one hydrogen on the amine nitrogen, the particular copper salt used has no effect on the type of product obtained. I may start with either a cupric or cuprous salt. The only requirement is that if a cuprous salt is used, it must be capable of existing in the cupric state and must form a complex with the primary or secondary amine that is soluble in the reaction medium. The necessity for being able to exist in the cupric state is based on my belief that the oxidation of the phenol is accomplished by the oxygen reacting with the amine-cuprous salt complex to form an intermediate activated, amine-basic cupric salt complex that reacts with the phenol to form an unstable intermediate which decomposes to form the self-condensation product of the phenol and water as the products and regenerates the amine-cuprous salt complex. This activated complex can also be formed by starting originally with a cupric salt in making the copper amine complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, adding an alkaline salt of a phenol (which may be the phenoxide of the phenol reactant) to a cupric salt, by treating a cupric salt with an ion-exchange resin having exchangeable hydroxyl groups, etc. Preferably, these reactions are carried out in the presence of the primary or secondary amine to prevent precipitation of the basic cupric salt, but it is possible to add the amine later to dissolve the basic cupric salt, even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide and cupric azide produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in primary of secondary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt, without first converting them to the corresponding basic cupric salt, gave no oxidation of monocyclic, 2,6-substituted phenols in the presence of a primary or secondary amine.

Examples of primary and secondary amines which are free of aryl substituents directly bonded to the amine nitrogen, i.e., the amine nitrogen is directly bonded to an aliphatic carbon atom, that may be used in practicing my invention are the aliphatic amines, including cycloaliphatic amines wherein the cycloaliphatic group is substituted on the amine nitrogen, for example, mono- and dimethylamine, mono- and diethylamine, mono- and dipropylamine, mono- and dibutylamine, mono- and disecondary propylamine, mono- and dibenzylamine, mono- and dicyclohexylamine, mono- and diethanolamine, ethylmethylamine, methylpropylamine, allylethylamine, methylcyclohexylamine, morpholine, methyl-n-butylamine, ethylisopropylamine, benzylmethylamine, octylbenzylamine, octylchlorobenzylamine, methylcyclohexylamine, methylphenethylamine, benzylethylamine, di(chlorophenethyl)-amine, 1 - methylamino - 2-phenylpropane, 1-methylamino-4-pentene, etc. When aliphatic amines are used, I prefer that the aliphatic groups be straight chain hydrocarbon groups.

In general, primary and secondary, mixed primary-secondary, mixed primary-tertiary or mixed secondary-tertiary polyamines would behave in the same way as primary and secondary monoamines in my reaction, except of course, the amount used would only have to be that amount necessary to give the equivalent amount of amino groups. Typical examples of these aliphatic polyamines are the N,N'-dialkylethylenediamines, N,N,N'-trialkylethylenediamine, propanediamine, ethylenediamine, the N-alkylethylenediamines, the N-alkylpropanediamines, the N,N'-dialkylpropanediamines, the N,N,N'-trialkylpropanediamines, propanediamine, the N-alkylpropanediamines, the N,N'-dialkylbutanediamines, pentanediamine, the N-alkylpentanediamines, the N,N'-dialkylpentanediamines, the N,N,N'-trialkylpentanedianes, diethylenetriamine, the N-alkyldiethylenetriamines, the N'-alkyldiethylenetriamines, the N,N',N''-trialkyldiethylenetriamines, the N,N',N''-trialkyldiethylenetriamines, the N,N',N',N''-tetraalkyldiethylenetriamines, the N',N',N'', N''-tetraalkyldiethylenetriamines, the cyclohexylenediamines, etc. Likewise, the polyamines may be mixed aliphatic and cyclic amines, e.g., aminoalkylpyridines, alkylaminoalkylpyridines, and so forth. I have, however, discovered that those polyamines which have only two or three aliphatic or cycloaliphatic carbon atoms separating the two primary or secondary amino nitrogens represent a class of polyamines which are strong chelating agents and form complexes with the copper salt which so completely envelop the copper that the complex is less reactive than the other aliphatic primary or secondary amines in the oxidation of 2,6-substituted phenols. Because of this, I prefer to use primary and secondary monoamines.

Examples of cyclic, secondary amines, i.e., alicyclic amines which incorporate the amine nitrogen in the ring, are pyrrole, pyrrolidine, piperidine, imidazole, tetrahydroquinoline, tetrahydroisoquinoline, morpholine, etc., including the ring-substituted products of these cyclic amines whereby one or more of the hydrogen atoms on the carbons forming the ring are subsituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups.

Many factors affect the stability of the complex of the primary or secondary amine and the copper salt. These factors are well known in the art and are discussed in detail in such texts as "The Chemistry of the Coordination Compounds" edited by John C. Bailar, Jr., Reinhold Publishing Corp., New York, 1956, see for example, pages 174 to 190; and "Mechanisms of Inorganic Reactions," Fred Basolo and Ralph G. Pearson, John Wiley and Sons, Inc., New York, 1958, see for example, pages 14–24. As pointed out in the latter text on page 18, one of the major factors influencing stability is the basicity of the ligand. I have found that apparently the ability to form a stable complex as indicated by the basicity of the primary and secondary amines I use as ligand also is an indication of the activity of the catalyst. Those primary and secondary amines which are strong bases form more active catalysts than primary and secondary amines which are weak bases. When the latter are used, I find that heating of the reaction mixture is desirable to cause the oxidation reaction to proceed rapidly. These catalysts can be used to advantage when it is desirable to prepare diphenoquinones from the starting phenols, as explained in more detail later, by carrying out the reaction at an elevated temperature preferably also removing the water of reaction as fast as it is formed.

The effect of an N-aryl group in primary and secondary amines, e.g., aniline, N-methylaniline, diphenylamine, etc., is to reduce the basicity of the amine so that its ability to form the copper complex is greatly reduced. Further, the stability of the amine under oxidizing conditions is greatly reduced. Because of these two effects I prefer to use primary or secondary amines which are free of an N-aryl substituent.

Typical examples of the phenols falling within the scope of the general formula which I may use in my reaction are: 2,6-dimethylphenol, 2,6-diethylphenol, the 2,6-dibutylphenols, 2,6-dilaurylphenol, the 2,6-dipropylphenols, 2,6-diphenylphenol, 2-methyl-6-ethylphenol, 2-methyl-6-propargylphenol, 2-methyl-6-cyclohexylphenol, 2-methyl-6 - benzylphenol, 2 - methyl - 6 - tolylphenol, 2-methyl-6-methoxyphenol, 2 - ethyl - 6 - phenylethylphenol, 2,6 - dimethoxyphenol, 2,3,6 - trimethylphenol, 2,3,5,6 - tetramethylphenol, 2,6-diethoxyphenol, 2-methoxy-6-ethoxyphenol, 2-ethyl - 6 - stearyloxyphenol, the 2,6-di-(chlorophenoxy)phenols, 2,6-dimethyl-3-chlorophenol, 2-methyl-6-bromophenol, 2-methyl-4-chloro-6-bromophenol, 2,3,5-trimethyl-6-chlorophenol, 2,6 - dimethyl-4-chlorophenol, 2,6 - dimethyl - 3 - chloro-5-bromophenol, 2,6-di-(chloroethyl)phenol, 2-methyl - 6 - isobutylphenol, 2-methyl-6-phenylphenol, 2,6-dibenzylphenol, 2,6-ditolylphenol, 2,6-di-(chloropropyl)phenol, 2,6-di-(2',4'-dichlorophenyl)-3-allylphenol, etc.

The preference of the oxidation reaction to involve the para positions with 2,6-disubstituted phenols is so pronounced that, if this position is substituted with a halogen and the two ortho positions with a hydrocarbon radical, the halogen will be removed even though the meta positions are unsubstituted. In such a case, the halogen atom reacts with and inactivates one molecule of copper in the complex. Therefore, it is desirable to use a sufficient amount of the complex to furnish one mole of copper for each atom of halogen removed, or to use a strong acid acceptor as explained later. This removal of halogen does not extend to phenols having a halogen in each of the ortho positions since in this case the electronegativity of the two halogens inactivates the phenolic hydroxyl group so that the phenol cannot be oxidized by my process. However, such halophenols may be oxidized to poly(halophenylene) ethers by the process disclosed in my copending application, Serial No. 248,191, filed December 31, 1962, now U.S. Patent, 3,234,183 or by the process disclosed and claimed in the copending application of Blanchard and Finkbeiner, Serial No. 248,228, filed December 31, 1962, now U.S. Patent, 3,256,243, both of which are assigned to the same assignee as the present invention. If a hydrocarbon and a halogen occupy the ortho positions and either hydrogen or a halogen occupies the para position, the para position appears to be preferentially involved in the oxidation reaction. Since the reaction involving hydrogen atoms in the para positions does not destroy the catalyst, only a small catalytic amount needs to be used, of the order of 0.1 to 10 mole percent based on the moles of phenol to be oxidized. Therefore, I prefer to use phenol in my oxidation process which has hydrogen in the para position.

As has been indicated previously, certain primary and secondary amines give an amine-copper complex which is more reactive in promoting or catalyzing the self-condensation reaction than others. But, with any one complex, the reactivity is dependent on the copper-to-phenol ratio. The higher the ratio, the more rapidly the reaction occurs and, in general, when polyphenylene ethers are being made, the higher the molecular weight will be. One way of obtaining a higher copper-to-phenol ratio without actually using a large ratio for the total phenol reacted is to add the phenol slowly to the solution of the amine-basic cupric salt complex through which oxygen is being bubbled. In this way there is very little unreacted phenol present in the reaction mixture and therefore the copper-to-phenol ratio is much higher than if all the phenol were added at once. I have noticed that when I carry out the preparation of polyphenylene ethers by this means, the products are lighter in color, indicating that this procedure still further suppresses side reactions, perhaps the formation of small amounts of diphenoquinones.

Haloalkyl and haloalkoxy groups are so reactive that they produce undesirable by-products in my oxidation reaction. Therefore, I prefer to exclude phenols containing such substituents from my reaction mixture as a principal reactant although they may be present in small quantities as modifiers. Other ring substituents such as nitro, cyano, carboxyl, formyl, etc., which are strongly electronegative or which are reactive with amines or copper salts should also be excluded as substituents of the phenols used as the principal reactants although phenols containing these groups can be used in minor amounts as modifiers of the polymer.

I have also determined that other groups, which have large spatial bulk, i.e., have a three dimensional structure approaching that of a sphere attached to the nucleus (commonly called crypto-phenols), although not stopping my oxidation reaction, do limit the reaction to the formation of diphenoquinones. As fas as I know, only a radical with an α-tertiary carbon atom, e.g., tertiary butyl, tertiary amyl, etc., is so bulky that the presence of only one such group in an ortho position will prevent the formation of the polyarylene ethers. The isopropyl group appears to be the borderline case since in the regular reaction both the diphenoquinone and the polyphenylene ether will be produced with the latter predominating if 2-methyl-6-isopropyl phenol is oxidized and the former predominating if 2,6-diisopropyl phenol is oxidized.

Aryl, alkoxy, and aryloxy groups, if present in both of the ortho positions, also will prevent the formation of the polyarylene ethers but will produce diphenoquinones from phenols which are unsubstituted in the para position. However, when these phenols have a halogen in the para position, they preferentially form the polyphenylene ethers.

This leads to the following observations concerning aliphatic, ortho substituents on the phenol starting materials. Substituents that have an aliphatic tertiary α-carbon atom will produce the corresponding diphenoquinones and prevent the formation of polyarylene ethers when at least one such ortho substituent is present. Substituents that have an aliphatic, secondary α-carbon atom will not prevent the formation of polyarylene ethers but one such ortho substituent will cause at least some formation of the corresponding diphenoquinone and two such ortho substituents will cause the major portion of the product to be the corresponding diphenoquinone and the minor portion to be the polyarylene ether. Ortho substituents having an aliphatic, primary α-carbon atom do not hinder the formation of polyarylene ethers at all.

Suprisingly, I have found that the very high molecular weight polyaraylene ethers can be made with extremely high softening points, in the range of 250–300° C. or greater, as shown by the pressing temperatures required to shape them. Depending on the conditions under which they are made they either remain thermoplastic under continued heating in vacuum at 250° C., or cure to an infusible state where they are no longer soluble in the usual organic solvents such as toluene, xylene, chloroform, nitrobenzene, etc., in which they are soluble prior to heat treating.

As previously mentioned, the type of product obtained by my process is dependent on the phenol used as the starting reactant, the amine used in the catalyst system, the modifiers present, and the reaction conditions. These products range from crystalline quinones of low molecular weight to polyarylene ethers of high molecular weight. It is also possible to produce products which cover the entire gamut between these two extremes. Low molecular weight materials can be obtained by controlling the amount of oxygen reacted, or by introducing into the reaction mixture a liquid which is a solvent for the starting reactants but is a non-solvent for the reaction products after they attain a predetermined molecular weight.

If at least one of the substituents occupying either the 2- or the 6-position in the phenol reactant represented by the general formula is a large, bulky organic group containing a tertiary α-carbon atom such as tertiary butyl, or if X is hydrogen and both substituents are aryl, e.g., phenyl, hydrocarbonoxy, e.g., methoxy, or haloaryloxy, e.g., chlorophenoxy, etc., or if the temperature of the reaction is high enough and preferably the water of reaction is removed as it is formed when any of the other phenols corresponding to the general formula are oxidized, the oxidation products are crystalline quinones having the structural formula:

(I)

$$\text{R}-\!\!\!\overset{\displaystyle O}{\underset{\displaystyle \phantom{O}}{\bigcirc}}\!\!\!-\text{R}'$$

(diphenoquinone structure with substituents R, R', R'', R'', R'', R'', R', R and carbonyl O at top and bottom)

where R, R' and R'' are as defined for the general formula. Theoretically, if each R'' is a different group or R and R' are different groups in the starting phenol, isomeric diphenoquinone should be produced. However, the diphenoquinone product from 2-methyl-6-t-butylphenol appears to be a single crystalline product with a sharp melting point and not separable by chromotography.

Based upon the above discussion of phenols, it is seen that to produce the high molecular weight polyarylene ethers of my invention, I must use particular phenols in my oxidation process that are all defined by the structural formula:

(II)

$$\text{Q}-\!\!\!\overset{\displaystyle OH}{\underset{\displaystyle X}{\bigcirc}}\!\!\!-\text{Q}'$$

(phenol structure with OH at top, X at bottom, and substituents Q, Q', Q'', Q'')

where X is as previously defined, Q is a monovalent substituent selected from the group consisting of hydrocarbon radicals free of a tertiary α-carbon atom, hydrocarbonoxy radicals free of a tertiary α-carbon atom, haloaryl radicals wherein all halogens are substituted on aromatic carbon atoms, and haloaryloxy radicals wherein all halogens are substituted on aromatic carbon atoms, Q' is the same as Q and in addition halogen, and Q'' is the same as Q and in addition hydrogen and halogen, with the proviso that X must be halogen when Q and Q' are each a member of the group consisting of aryl radicals, haloaryl radicals, hydrocarbonoxy radicals and haloaryloxy radicals. Preferably, Q'' represents hydrogen.

The term "free of a tertiary α-carbon atom" means that the terminal carbon atom of the aliphatic hydrocarbon substituent which is attached to the phenol nucleus has at least one hydrogen atom attached to it.

Typical examples of substituents that may be present in the phenols of this invention and which have an aliphatic, tertiary α-carbon atom are:

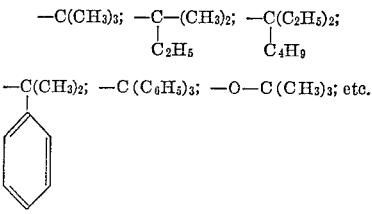

When X represents chlorine, bromine, or iodine, then at least one equivalent of copper must be used in the form of the complex with the amine for each equivalent of halogen, or a strong acid acceptor, for example, a base must be added to effectively remove the halogen and regenerate the basic-cupric salt in the complex. Any halogen removed from substituent groups must also be compensated for by a corresponding increase in copper catalyst or base. Since it is difficult to introduce a fluorine substituent onto the benzene ring of a phenol and fluorine would offer no advantages over the other halogens if in the reactive position, I prefer not to have X be fluorine. When X is hydrogen, only an extremely small amount of copper complex needs to be used. Because of this, I prefer to use those phenols wherein the X of Formula II represents hydrogen. It should be remembered that the rate of oxidation is dependent upon the amount of copper catalyst present. In order to have a reasonably fast reaction, I prefer to use at least 0.25 mole percent of copper catalyst based on the amount of phenol used. For each atom of copper I desire two atoms of amino nitrogen. Lower amounts of amine favor the formation of diphenoquinones as a by-product in the preparation of polyphenylene ethers. A lower ratio can be used when diphenoquinones are the desired product.

It will be seen that the phenols embraced by the general formula (1) have no more than one halogen in the ortho position, (2) have a halogen in the para position when both substituents in the ortho positions are aryl, hydrocarbonoxy, haloaryl or haloaryloxy with respect to the hydroxyl group, and (3) have a reactive para position with respect to the phenolic hydroxyl.

It will be seen that when such phenols are oxidized to resins by the method of my invention the polyarylene ethers so produced will have repeating units that correspond to the structural formula (III)

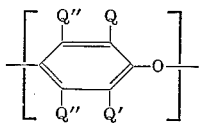

where Q, Q' and Q'' are as defined for the phenol starting material corresponding to Formula II, and the oxygen atom of one unit is connected to the benzene nucleus of the adjoining unit. It is understood that this repeating unit forms a long chain to provide a final molecular structure representing many of the repeating units. Such a molecular structure can be represented by the formula (IV)

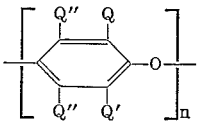

where $n$ is an integer of indeterminate value since the resinous products are mixtures of different chain lengths and the ordinary means of determining molecular weights give an average value. For those materials of low molecular weight, $n$ is an average of 10 to 15, while for the high molecular weight resins having film and fiber forming properties it is 100 to 1500, or greater.

My oxidation process is capable of producing polyarylene ethers having molecular weights of at least 10,000. Such resins represent polymers having at least 100 repeating units, i.e, n in Formula IV is at least 100. These high molecular weight materials are new chemical compositions disclosed and claimed in my copending application, Serial No. 212,128. Polyarylene ethers previously have been made, for example, by the Ullman reaction between a para-bromophenol and a potassium phenate in the presence of copper powder. However, such a reaction is apparently not capable of preparing polyarylene ethers having more than about eight repeating units so that the molecular weights are limited to about 1,000. Such materials are still crystalline in nature having sharp melting points. For example, if diphenyl oxide is brominated and reacted with potassium phenate and the resulting compound, repeatedly brominated and reacted with potassium phenate the limiting product appears to be $$C_6H_5O(C_6H_4O)_6C_6H_5$$

having a melting point of 199–200° C.

The preferred classes of phenols for making high molecular weight resins are those corresponding to the formula (V)

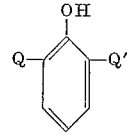

where Q and Q' are as defined for Formula II and the three positions shown without substituents have a hydrogen atom attached to the ring carbon.

Typical examples of the monovalent hydrocarbon radicals that R, R', R'', Q, Q' and Q'' may be in all of the preceding formulae are: alkyl, including cycloalkyl, e.g., methyl, ethyl, propyl, isopropyl, butyl, secondary butyl, tertiary-butyl, isobutyl, cyclobutyl, amyl, cyclopentyl, hexyl, cyclohexyl, methylcyclohexyl, ethycyclo-hexyl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent haloaryl radicals may be the same as the aryl radicals, as outlined above, wherein one or more of the hydrogen atoms on the aromatic carbon atoms are replaced by halogen, examples of which are: mono-, di-, tri-, tetra- and pentachlorophenyl, mono-, di-, tri- and tetra-bromotolyl, ethychlorophenyl, fluoro-xylyl, chloronaphthyl, bromobenzyl, iodophenylethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, toloxy, naphthoxy, methylnaphthoxy, benzoxy, phenylethoxy, phenylpropoxy, tolylethoxy, etc. The monovalent haloaryloxy radicals may be the same as the above aryloxy radicals, where one or more of the hydrogens on the aromatic carbon atoms are replaced by a haolgen, i.e., fluorine, chlorine, bromine, or iodine, a few typical examples of which are: mono-, di-, tri-, tetra- and pentachlorophenoxy, mono-, di-, tri-, and tetrabromotoloxy, ethylfluorophenoxy, ethylchlorophenoxy, iodoxyloxy, chloronaphthoxy, bromobenzoxy, iodophenylethoxy, bromotolylethoxy, etc.

Although I do not want to be bound by my theory, I believe that one mole of a copper salt forms a complex with two moles of amine nitrogen in the amine, e.g., a mole of monoamine has one mole of amine nitrogen, a diamine has two moles of amine nitrogen, etc. However, it is possible to carry out my reaction with as little as 0.66 mole of amine nitrogen to one mole of copper. In this case, it may be that only part of the copper is complexed or polynuclear complexes may be formed. At this low ratio, diphenoquinones become the predominant product and polyphenylene ethers the subordinate product even though the other reaction conditions are such that polyphenylene ethers would normally be formed. The complex formed from a cuprous salt and a primary or secondary amine can react with oxygen to form an oxidized intermediate while the complex formed from a cupric salt is already in the form of the oxidized intermediate which in some manner can form a complex with the phenol. This latter complex activates the aryl nucleus in some ways so that either the polymeric chains or diphenoquinones are formed, with the regeneration of the catalyst in the reduced or cuprous state which can react with additional oxygen to form the active oxidized intermediate. This belief is based on the fact that, if I pass oxygen into my catalyst system prepared from a cuprous salt until it is saturated or treat one equivalent of a cupric salt with one equivalent of a base and then add the phenol, with no further addition of oxygen, one mole of phenol is oxidized for two moles of catalyst present. By such a reaction, I can cause the self-condensation of phenols without actually passing oxygen into the reaction system containing the phenol. These reactions are illustrated by the following equations using $\phi$ to represent the aryl nucleus of the phenol reactant and (A) to represent a primary or secondary aliphatic monoamine KOH as representative of a typical base and CuCl and CuCl$_2$ as representative of typical cuprous and cupric salts.

Preparation of Primary or Secondary Aliphatic Amine-Basic Cupric Salt Complex

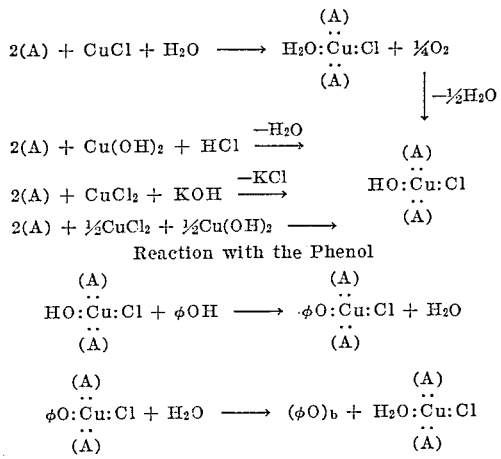

Reaction with the Phenol where $b$ can be two or more. When $b$ is two the product may be either a diphenoquinone or a polyphenylene ether dimer. It will be noted that although the above is theoretical it does provide indications as to the role of water in determining the nature of the product and how the complex is regenerated and acts as the oxygen-carrying intermediate. Since water is a product of the reaction and completely anhydrous reagents are extremely difficult to obtain, I have never found it necessary to actually add water to the reaction mixture even when starting with a cuprous salt.

As will be evident from the above equations, it is desirable when starting with a cupric salt to add one equivalent of base for each mole of copper salt to most effectively use all of the copper. If less base is added then only the equivalent amount of copper salt is converted to the catalytically active primary or secondary aliphatic amine-basic cupric salt complex leaving the balance of the cupric salt unchanged which even in the form of its primary or secondary aliphatic amine complex is an inactive ingredient in the system. Likewise, if more than one equivalent of base is added, then some or all of the cupric salt is converted into cupric hydroxide which likewise is an inactive ingredient even in the form of its primary or secondary aliphatic amine complex. In effect, the addition of more or less than one equivalent of base, i.e., one mole of hydroxyl ion, to a mole of cupric salt results in the same effect as though less of the cupric salt had been used to form the primary or secondary aliphatic amine-basic cupric salt complex. This same effect is noted if more than one equivalent of acid, i.e., one mole of hydrogen ions or one mole of a cupric salt is added to one mole of cupric hydroxide in forming the complex.

The cupric salts of carboxylic acids, for example, cupric acetate, cupric benzoate, etc., represents a unique class of cupric salts. They will form a complex with primary or secondary aliphatic amines which, in the presence of oxygen, will produce polyphenylene ethers but these products are much lower in molecular weight and the reaction is slower than if the cupric carboxylate had been converted to the corresponding primary or secondary aliphatic amine-basic cupric carboxylate complex. Evidently because of the weakly acidic nature of carboxylic acids, the phenol and the cupric carboxylic complex are in equilibrium with the phenol complex and the carboxylic acid according to the following equation where $\phi$ represents the aryl nucleus of the phenol and AcO represents the carboxylate ion and (A) represents a primary or secondary aliphatic monoamine

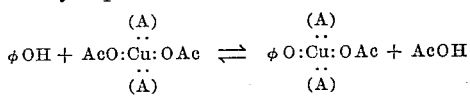

Apparently the equilibrium is predominantly to the left-hand side of the equation, since the slow reaction indicates a low concentration of the active species.

It will be noted that this phenol-cupric complex on the right-hand side of the equation is the same as would be obtained from a cuprous salt and oxygen or a cupric salt and a base when reacted with a phenol in a non-equilibrium reaction. In the specification and claims, I use the term "amine-basic cupric salt complex wherein the amine has an amine nitrogen free of directly bonded aryl substituents and has at least one hydrogen on the amine nitrogen" to denote the catalytically active complex described above which acts or is used as the oxygen-carrying intermediate in the oxidation of the phenols to self-condensation products. As shown above, this complex can be obtained either from cuprous or cupric salts and oxidizes the phenols to self-condensation products while the copper in the complex is reduced to the cuprous state.

If the quantity of phenol to be reacted is greater than can be oxidized by the amount of complex present, oxygen is introduced into the reaction mixture to reoxidize the cuprous complex back to the basic cupric complex. Whether this is done or whether the stoichiometric amount of the primary or secondary amine-basic cupric salt complex is used to oxidize the phenol, the net overall reaction in either case is the reaction of oxygen, either elemental or, from the complex, with the phenol. This reaction, therefore, may best be described as the reaction of phenols with oxygen using the primary or secondary amine-basic cupric complex as the oxygen-carrying intermediate.

Although mixtures of primary and secondary or mixture with tertiary amines and mixtures of copper salts may be used, no benefit would accrue from such use. Preferably, the copper complex is dissolved in the solvent before the phenol reactant is added. In some cases the dissolving of a cuprous salt, if it is used, may be hastened by heating the mixture, by bubbling in air or oxygen, or a combination thereof. In order to effectively use all of the copper, enough amine should be added to complex and thereby dissolve all of the added copper salt. Larger excesses of amine do not adversely affect the reaction, and, in some cases, may be desirable in order to completely dissolve all of the phenol reactant, to suppress diphenoquinone formation, to increase solubility of the complex and may even be used as a solvent for the reaction product. Other solvents such as alcohols, ketones, hydrocarbons, chlorohydrocarbons, nitrohydrocarbons, ethers, esters, amides, mixed ether-esters, sulfoxides, etc., may be present in the reaction system providing they do not interfere or enter into the oxidation reaction. The sole function of the solvent is to provide a liquid phase in which both the phenol and the amine-basic cupric salt complex is soluble. It need not act as a solvent for the reaction products. The very high molecular weight polyphenylene ethers greatly increase the viscosity of the reaction mixture. Therefore, it is sometimes desirable to use a solvent system which will cause them to precipitate while permitting the lower molecular weight polymers to remain in solution until they form the higher molecular weight polymers.

When less than the stoichiometric amount of the described amine-basic cupric salt complex is used, oxygen or an oxygen-containing gas is bubbled into the reaction mixture causing an exothermic reaction to take place with the formation of water as a by-product. Since this method permits the same products to be formed but uses less quantities of the complex, I prefer to use this method. If resins are the desired product and a solvent is used which is not miscible with the water formed, it is desirable to remove the water fast enough to prevent the formation of a separate phase which tends to inactivate the catalyst, perhaps by extraction or hydrolysis. The addition of alcohols, for example, ethanol, isopropanol, etc., which are miscible with the reaction mixture, can be used to prevent the formation of an aqueous phase. When the solvent is miscible with water, no special precautions need to be taken to remove the water when the solvent is not to be reused without purification, e.g., in a batch process. However, water may be removed if desired and should be removed if the solvent is to be reused without purification, e.g., in a continuous recycling process. If the desired products are diphenoquinones, provisions should be made to allow the water to escape as fast as it is formed, to minimize polymer formation, but, generally it is not required for those phenols, as explained earlier, which cannot form polyarylene ethers. Water can be removed from these reactions, for example, by sweeping with an inert gas, by carrying out the reaction at subatmospheric pressure, by use of desiccants, by azeotropic distillation, by the use of open reaction vessels by heat, or any combination theerof. Desiccants are especially useful for removing excess water where the water forms faster than it can evaporate and it forms a separate phase. In carrying out my reaction, the oxygen can be diluted with an inert gas such as nitrogen, helium, argon, etc., or air can be used. By controlling the ratio of oxygen to inert gas and the inlet temperature of this mixture, I can conveniently sweep the reaction mixture to cause removal of the water as it is formed.

Since the reaction is usually exothermic, the reaction can become overheated, resulting in the formation of undesirable products. This is especially true in the formation of resins where I have noticed that if I do not control the heat of reaction, the resins tend to cross-link and form gels, or the amines tend to oxidize and discolor the product. Generally, for polymer formation, I initiate the oxidation reaction at as low a temperature as the reaction will start, as evidenced by the reaction becoming exothermic. Higher temperatures favor the formation of diphenoquinones. Usually, I control my oxidation reaction so that the maximum temperature does not exceed 75° C. and preferably does not exceed 50° C. The heat of reaction may be removed, for example, by radiation, convection, or by cooling coils which can either be immersed in, or surround the reaction vessel.

Ordinarily, I continue the passage of oxygen into the reaction mixture until no more heat is generated, or the desired amount of oxygen is absorbed. Alternatively, I may intermittently or continuously add the same or a different phenol than the starting material during the oxidation reaction. If a different phenol is added, the product is a mixed polyarylene ether which has a different structure than if the mixed phenols were used as starting materials. To terminate the reaction, I destroy the catalyst system by addition of an acid preferably a mineral acid, such as hydrochloric or sulfuric acid, or a base, for example, lime, sodium hydroxide, potassium hydroxide, etc., which reacts with the complex of the amine and basic cupric salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product or I may add a chelating agent which inactivates the copper, or I may pass the solution over an adsorbent for the catalyst and other by-products. After the product is precipitated, it may be redissolved and reprecipitated any desirable number of times to remove impurities. Finally, it is filtered and washed free of any remaining contaminants. When dry, the product, if a quinone, is ready to be used as a chemical compound or, if it is a resin, it can be fabricated into useful products by molding, extrusion, melt spinning, etc., or it may be dissolved in solvents to prepare solutions which can be used in the preparation of coatings, fibers, adhesives, etc.

Modifiers of the reaction can be added to the reaction mixture to yield products that have improved properties over the products prepared in the absence of the modifier. Modifiers which I have found to be particularly useful in my process are: anion exchange resins, especially those containing tertiary amine groups as the active moiety, nitro-aromatics such as mono-, di-, and trinitrobenzenes, mono-, di-, and trinitrophenols, etc.; peroxide deactivators, such as heavy metals and their oxides; adsorbents such as activated charcoal, silica gel, alumina, etc.

Although the anion exchange resins are insoluble in the reaction mixture, it appears that they function in some way, probably as promoters or cocatalysts, with the copper-amine complex. As far as I am aware, there is no requirements that these resins must meet other than that they must be able to adsorb anions which is a characteristic of all anion exchange resins. Typical examples of such anion exchange resins which I can use are amine-modified or quaternized polymers, e.g., crosslinked styrene-divinyl benzene polymers, styrene-glycol dimethacrylate polymers, aniline-formaldehyde resins, aryl polyamine-formaldehyde resins, phenol-formaldehyde resins, urea-formaldehyde resins, melamine-formaldehyde resins, etc., which have been modified with amines. Those compounds which are reaction products of formaldehyde can be modified with amines while in the methylol stage. All compounds can be chlormethylated and then reacted with amines. Such materials are readily available commercial products.

The effect of adding nitroaromatics such as picric acid and nitrobenzenes to the reaction mixture appears to be the destruction or the prevention of the formation of by-products which would react with the main product to produce an impure material of less desirable properties. The use of nitroaromatics is extremely advantageous for producing resinous materials of much lighter color than is possible under the same reaction conditions when they are absent. Their use is particularly desirable when using primary or secondary amines as the catalyst which are oxidatively unstable at the reaction temperature, i.e., easily discolor in the presence of oxygen, e.g., aliphatic amines. However, they generally do not need to be used when the reaction temperature is near ambient room temperature. Since the nitrophenols can form complexes with the copper-amine catalyst, enough catalyst should be used to supply an excess of catalyst over that which will react with any nitrophenol present.

In order to prevent the accumulation of peroxides which may cause attack of the phenol at an undesired position on the aromatic ring, peroxide deactivators can be employed, for example, selenium, silicon, lead, mercury, copper, siliver, gold, nickel, palladium, platinum, cobalt, rhodium, iridium, iron, ruthenium, osmium, manganese, chromium, molybdenum, tungsten, vanadium, niobium, cerium, thorium, etc., and their oxides or salts. Other peroxide deactivators are described on pages 467–501 of "Hydrogen Peroxide" by Schumb, Satterfield and Wentworth, Reinhold Pub. Corp., New York, New York, 1955.

The reaction can also be carried out in the presence of adsorbents which tend to remove by-products present in minor amounts and which may adversely affect the reaction or the reaction mixture may be treated with these adsorbents after completion of the reaction. Examples of these adsorbents are activated carbon, silica gel (including zerogels, aerogels, fume silica, etc.), alumina, magnesium silicate, etc.

I have also found that I may improve the quality of my polyarylene ethers if I add an organic sulfur containing compound which also has reducing properties to a solution of the product at the end of the oxidation reaction. Typical of such compounds are thiourea and its derivatives. These materials not only remove all of the copper from the product but they also destroy color-forming by-products which may be undesirable in the final product. These color formers appear to be diphenoquinones. Such colored materials are true chemical by-products and not part of the polymer molecule since they may be removed from the polymer.

In order that those skilled in the art may better understand my invention, the following examples are given which are illustrative of the practice of my invention and are not intended for purposes of limitation. In the examples all parts are by weight unless stated otherwise.

*Example 1*

Oxygen was bubbled through a vigorously stirred solution containing 0.25 gram of cuprous chloride, 0.45 gram of N,N-dimethylamine dissolved in 120 ml. aliquot of a mixed solvent prepared from 90 ml. of toluene and 50 ml. of isopropanol contained in a reaction vessel immersed in a constant temperature bath maintained at 30° C. Over a 20-minute period, 10 grams of 2,6-dimethylphenol dissolved in the remainder of the above mixed solvent was added. The reaction was continued for an additional 70 minutes, by which time the polymer had precipitated from the reaction mixture and was removed by filtration, washed with methanol containing a small amount of concentrated hydrochloric acid, and then with acetone. After drying at 110° in vacuo, there was obtained 8.5 grams of a colorless polymer having an intrinsic viscosity of 0.51 measured in chloroform at 25° C. The product was identified as poly(2,6-dimethyl-1,4-phenylene)ether, characterized by the recurrent structural units of the formula

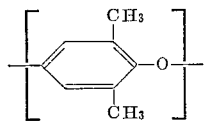

where the oxygen atom of one unit is joined directly to the phenyl nucleus of the adjacent unit.

*Example 2*

Example 1 was repeated but using 0.2 gram of cuprous chloride and 0.36 gram of N-ethylamine as the catalyst. The yield was 9.0 grams of a polymer having an intrinsic viscosity of 0.39.

*Example 3*

Example 1 was repeated in that 0.2 gram of cuprous chloride and 0.25 gram of N-methylamine was used as the catalyst. The yield was 7.9 grams of polymer having an intrinsic viscosity of 0.42.

*Example 4*

Example 1 was repeated using 0.15 gram of cuprous bromide and 0.44 gram of N,N-diethylamine and using as the mixed solvent 80 ml. of benzene and 60 ml. of isopropanol. The yield was 7.7 grams of polymer having an intrinsic viscosity of 0.36.

*Example 5*

Oxygen was bubbled through a vigorously stirred solution of 6.24 ml. of N,N-diethylamine, 0.870 gram of cuprous bromide dissolved in 720 ml. of benzene containing suspended 30 grams of an anhydrous magnesium sulfate. A solution of 60 grams of 2,6-xylenol dissolved in 120 ml. of benzene was added over a period of 19 minutes. The reaction mixture was contained in a container immersed in a constant temperature bath maintained at 30° C. After a total reaction time of 88 minutes, 7 ml. of a 50% aqueous solution of sodium hydroxide was added and the solution filtered. The polymer was precipitated by the addition of 500 ml. of methanol acidified with acetic acid. The polymer was removed by filtration and was washed with methanol and water and dried. The resulting polymer had an intrinsic viscosity of 0.58 and gave a colorless, transparent, flexible film when pressed at 300° C. Analysis of the polymer showed it contained only 15 p.p.m. of copper, 47 p.p.m. of chlorine, 17 p.p.m. of bromine and 590 p.p.m. of nitrogen. The polymer had a melt viscosity of 260,000 poises at 315° C. (shear stress 930,000 dynes/cm.$^2$).

*Example 6*

The following example illustrates that a polymer having a lower melt viscosity but high intrinsic viscosity, which is indicative of more uniform molecular weight distribution, may be obtained by carrying out my reaction in a multiple stage procedure, than is obtained when the entire reaction is carried out in a single stage. Three reactors were connected in series so that the overflow of the first reactor fed to the second reactor and thence to the third reactor. The volume of the first and third reactors was approximately 30 ml. while the second reactor was approximately 100 ml. A solution was prepared under nitrogen to exclude oxygen containing 105 grams of 2,6-dimethylphenol, 3 grams of cuprous chloride and 5.4 grams of N,N-dimethylamine dissolved in 1050 ml. of benzene and 420 ml. of absolute ethanol. The solution was added dropwise to the first reactor over a 6-hour period with oxygen being bubbled into each of the three reactors. The overflow from the third reactor was collected in 150 ml. fractions, which were treated with 50 ml. of ethanol to precipitate the polymer which was removed by filtration and washed with approximately 25 ml. of ethanol containing 10% hydrochloric acid, then with 25 ml. of ethanol and dried at 110° for 3 hours. The total yield of polymer was 88.1 grams which were blended by dissolving in benzene and reprecipitating with methanol. The polymer so obtained had an intrinsic viscosity of 0.46 and a melt viscosity of 53,000 centipoises at 300° C. When the reaction was carried out with identical quantities of reactants but carried out in a single reactor, the melt viscosity of the polymer obtained was too high to measure at 300° C.

The following two examples illustrate the preparation of diphenoquinones.

*Example 7*

Oxygen was passed into a vigorously stirred solution of 0.2 gram of cuprous chloride, 0.36 gram of N,N-dimethylamine and 10 grams of 2,6-di-t-butylphenol. The solution was contained in a reaction vessel immersed in a constant temperature bath maintained at 30° C. Over a period of 30 minutes, the reaction mixture rose to a temperature of 37° C. during which time the 3,3',5,5'-tetra-t-butyldiphenoquinone-4,4' separated as deep red needles having metallic sheen which were removed by filtration and washed with ethyl alcohol containing a small amount of hydrochloric acid. The yield was 8.4 grams of crystals having a melting point of 246°–247° C.

*Example 8*

In the same manner as in Example 7, 10 grams of 2,6-diisopropyl phenol were oxidized to yield 7.4 grams of 3,3′,5,5′-tetraisopropyldiphenoquinone-4,4′ as deep rose-colored crystals having a melting point of 209°–211° C. along with 0.59 gram of poly(2,6-diisopropyl-1,4-phenylene)-ether.

*Example 9*

Instead of starting with a cuprous salt to prepare the amine-basic cupric salt complex, I may utilize cupric salts. For example, when Example 1 is repeated, but using 0.25 gram of cupric chloride dihydrate in place of the cuprous chloride, no reaction occurs. However, if the same reaction mixture containing the cupric chloride dihydrate is treated with 0.14 gram of potassium hydroxide dissolved in 5 ml. of ethanol, the reaction proceeds as rapidly and with the same results as when the cuprous chloride was used. Likewise, the polyphenylene ether is obtained when 0.25 gram of cupric hydroxide and 0.81 ml. of 1.2 molar hydrochloric acid is substituted for the cuprous chloride, or 0.125 gram of cupric hydroxide and 0.21 gram of cupric chloride dihydrate are substituted for the cuprous chloride as the source of copper complex in Example 1.

Because of their excellent physical, mechanical, chemical, electrical and thermal properties, the polymers of this invention have many and varied uses. For example, they can be used in molding powder formulations, either alone or mixed with other polymers and may contain various fillers, such as wood flour, diatomaceous earth, carbon black, silica, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They can be used to prepare molded, calendered, or extruded articles, films, coatings, threads, filaments, tapes and the like. They can be applied to a broad spectrum of uses in the form of sheets, rods, tapes, etc. and are useful in electrical applications, such as in cable terminals, terminal blocks, backing for electrical circuits, as components of dynamoelectric machines that operate at high temperatures, etc. Films of these materials can be prepared by suitable means, such as by dissolving or suspending them in a suitable solvent, followed by spreading on a surface from which the polymer is removed after evaporation of the solvent, by calendering or extrusion, etc. These films (either oriented or not) are useful as metal or fiber liners, containers, covers, closures, electrical insulating tapes, as sound recording tapes, magnetic tapes, photographic films, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics, useful in many applications, for example, as filter cloths where high chemical and heat resistance is desired. Their excellent electrical properties make laminates of their material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

The non-polymeric products exhibit the same utility as the same compounds prepared by any other method. Thus, the quinones and diphenoquinones can be used as dyes, etc., and in the reduced form as antioxidants. In addition, these compounds can be used as chemical intermediates in the preparation of other materials, such as polymers. For example, the diphenoquinones can be reduced to dihydroxy compounds of the bisphenol type which are useful in preparing epoxide, polyester, polycarbonate, etc. resins.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of forming self-condensation products of phenols selected from the group consisting of polyphenylene ethers and diphenoquinones which comprises reacting oxygen with a phenol having the structural formula

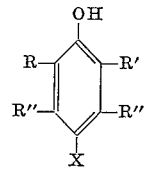

where X is selected from the group consisting of hydrogen, chlorine, bromine and iodine, R is a monovalent substituent selected from the group consisting of hydrocarbon radicals, hydrocarbonoxy radicals, haloaryl radicals where in all halogens are bonded to aromatic carbon atoms, and haloaryloxy radicals wherein all halogens are bonded to aromatic carbon atoms, R′ is the same as R and in addition halogen, R″ is the same as R and in addition hydrogen and halogen, using as the oxygen-carrying intermediate a solution of an amine-basic cupric salt complex in which the said phenol is soluble, said amine being selected from the group consisting of monoamines, diamines and triamines whose amine nitrogen atoms are directly bonded to an aliphatic carbon atom and at least one of said nitrogen atoms has at least one directly bonded hydrogen atom.

2. The process of forming self-condensation products of phenols selected from the group consisting of polyphenylene ethers and diphenoquinones which comprises reacting oxygen with a phenol having the structural formula

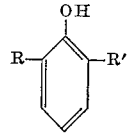

where R and R′ are hydrocarbon radicals, using as the oxygen-carrying intermediate a solution of an amine-basic cupric salt complex in which the said phenol is soluble, said amine being selected from the group consisting of monoamines, diamines and triamines whose amine nitrogen atoms are directly bonded to an aliphatic carbon atom and at least one of said nitrogen atoms has at least one directly bonded hydrogen atom.

3. The process of claim 2 wherein R and R′ are alkyl radicals and said amine is an alkyl monoamine having at least one hydrogen atom directly bonded to the amine nitrogen atom.

4. The process of claim 2 wherein R and R′ are methyl radicals and said amine is an alkyl monoamine having at least one hydrogen atom directly bonded to the amine nitrogen atom.

5. The process of preparing diphenoquinones which comprises reacting oxygen with a phenol having the structural formula

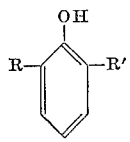

where R and R' are monovalent hydrocarbon radicals with the proviso that at least R is a monovalent hydrocarbon radical having an aliphatic tertiary α-carbon atom, using as the oxygen-carrying intermediate a solution of an amine-basic cupric salt complex in which the said phenol is soluble, said amine being selected from the group consisting of monoamines, diamines and triamines whose amine nitrogen atoms are directly bonded to an aliphatic carbon atom and at least one of said nitrogen atoms has at least one directly bonded hydrogen atom.

6. The process of claim 5 wherein R and R' are each a monovalent hydrocarbon radical having an aliphatic tertiary α-carbon atom and said amine is an alkyl monoamine having at least one hydrogen atom directly bonded to the amine nitrogen atom.

7. The process of preparing 1,4-polyphenylene ethers which comprises reacting oxygen with a phenol having the structural formula

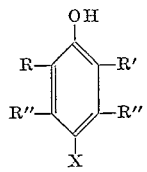

where X is selected from the group consisting of hydrogen and halogen, R is a monovalent substituent selected from the group consisting of hydrocarbon radicals, hydrocarbonoxy radicals, haloaryl radicals wherein all halogens are bonded to aromatic carbon atoms, and haloaryloxy radicals wherein all halogens are bonded to aromatic carbon atoms, R' is the same as R and in addition halogen, R" is the same as R and in addition hydrogen and halogen, with the provisos that the α-carbon atom of R, R' and R" has at least one hydrogen atom attached to it when the α-carbon atom is an aliphatic carbon atom and X must be halogen when R and R' are each a radical selected from the group consisting of aryl radicals, haloaryl radicals, hydrocarbonoxy radicals and haloaryloxy radicals, using as the oxygen-carrying intermediate a solution of an amine-basic cupric salt complex in which the said phenol is soluble, said amine being selected from the group consisting of monoamines, diamines and triamines whose amine nitrogen atoms are directly bonded to an aliphatic carbon atom and at least one of said nitrogen atoms has at least one directly bonded hydrogen atom.

8. The process of forming 1,4-polyphenylene ethers which comprises reacting oxygen with a phenol having the structural formula

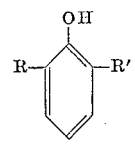

where R and R' are each a hydrocarbon radical, at least one of which is an alkyl radical, with the proviso that the α-carbon atom of said hydrocarbon radical has at least one hydrogen atom attached to it when the α-carbon atom is an aliphatic carbon atom using as the oxygen-carrying intermediate a solution of an amine-basic cupric salt complex in which the said phenol is soluble, said amine being selected from the group consisting of monoamines, diamines and triamines whose amine nitrogen atoms are directly bonded to an aliphatic carbon atom and at least one of said nitrogen atoms has at least one directly bonded hydrogen atom.

9. The process of claim 8 wherein R and R' are each an alkyl radical having an α-carbon atom having at least one hydrogen atom attached to it and said amine is an alkyl monoamine having at least one hydrogen atom directly bonded to the amine nitrogen atom.

10. The process of claim 8 wherein R and R' are each methyl and said amine is an alkyl monoamine having at least one hydrogen atom directly bonded to the amine nitrogen atom.

References Cited by the Examiner

Brackman et al.: Rec. Trav. Chem., vol. 74, pages 937–946 (1955).

Hay: J. Polymer Science, vol. 58, pages 581–589 (1962).

WILLIAM H. SHORT, *Primary Examiner.*

SAMUEL H. BLECH, *Examiner.*

C. A. WENDEL, J. C. MARTIN, *Assistant Examiners.*